Feb. 27, 1945. A. O. MICKELSON 2,370,254
PIPELINE COATING AND WRAPPING MACHINE
Filed Nov. 10, 1941 9 Sheets-Sheet 1

INVENTOR.
Alfred O. Mickelson
BY George H. Simmons
Atty.

Feb. 27, 1945. A. O. MICKELSON 2,370,254
PIPELINE COATING AND WRAPPING MACHINE
Filed Nov. 10, 1941 9 Sheets-Sheet 3

INVENTOR.
Alfred O. Mickelson
BY George H. Simmons
Atty.

Feb. 27, 1945.        A. O. MICKELSON         2,370,254
              PIPELINE COATING AND WRAPPING MACHINE
                  Filed Nov. 10, 1941        9 Sheets-Sheet 4

INVENTOR.
Alfred O. Mickelson
BY George H. Simmons
Atty.

Feb. 27, 1945. A. O. MICKELSON 2,370,254
PIPELINE COATING AND WRAPPING MACHINE
Filed Nov. 10, 1941 9 Sheets-Sheet 5

INVENTOR.
Alfred O. Mickelson
BY George H. Simmons
Atty.

Feb. 27, 1945.   A. O. MICKELSON   2,370,254
PIPELINE COATING AND WRAPPING MACHINE
Filed Nov. 10, 1941   9 Sheets-Sheet 6

INVENTOR.
Alfred O. Mickelson
BY George H. Simmons
Atty.

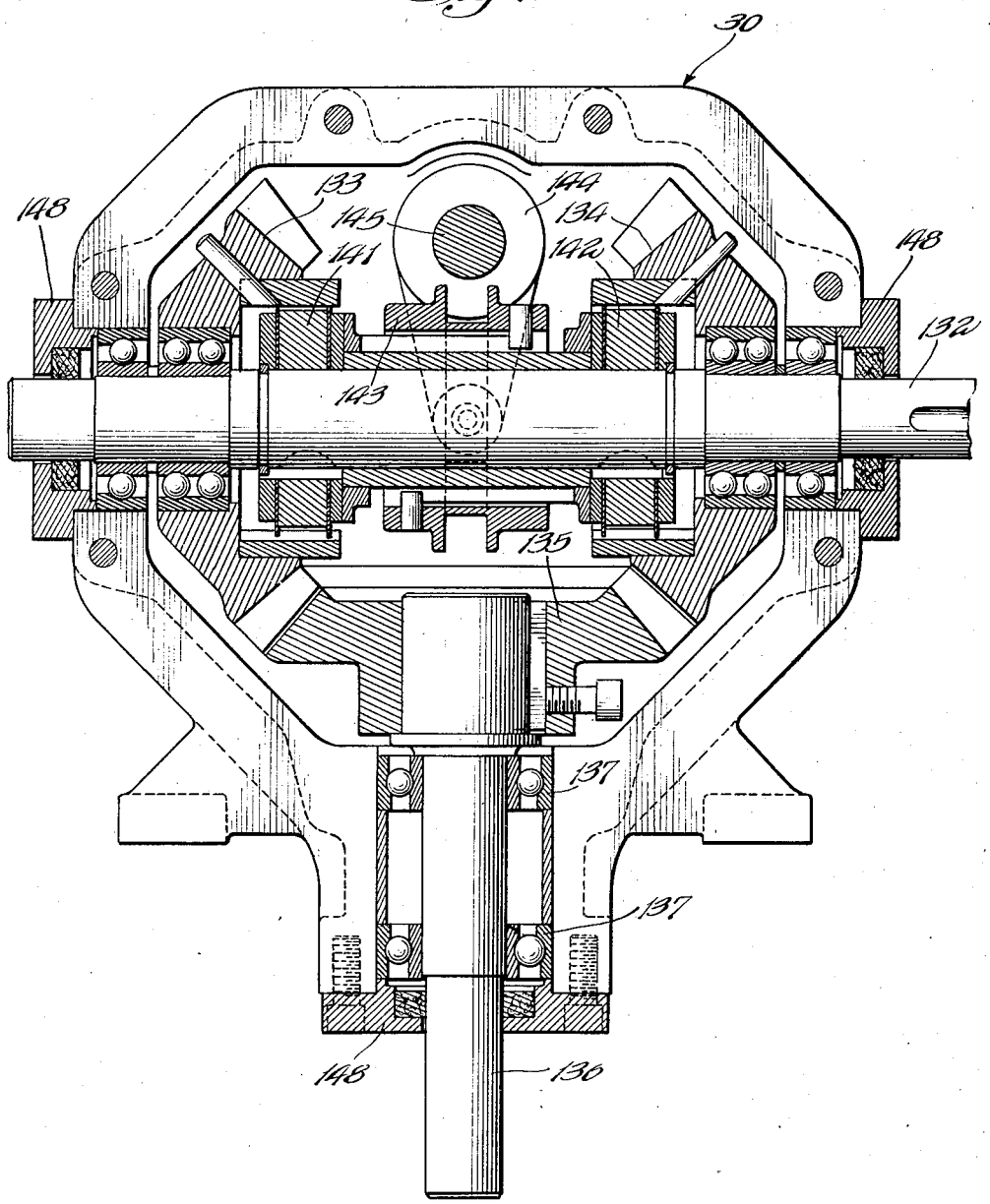

Feb. 27, 1945.    A. O. MICKELSON    2,370,254
PIPELINE COATING AND WRAPPING MACHINE
Filed Nov. 10, 1941    9 Sheets-Sheet 8
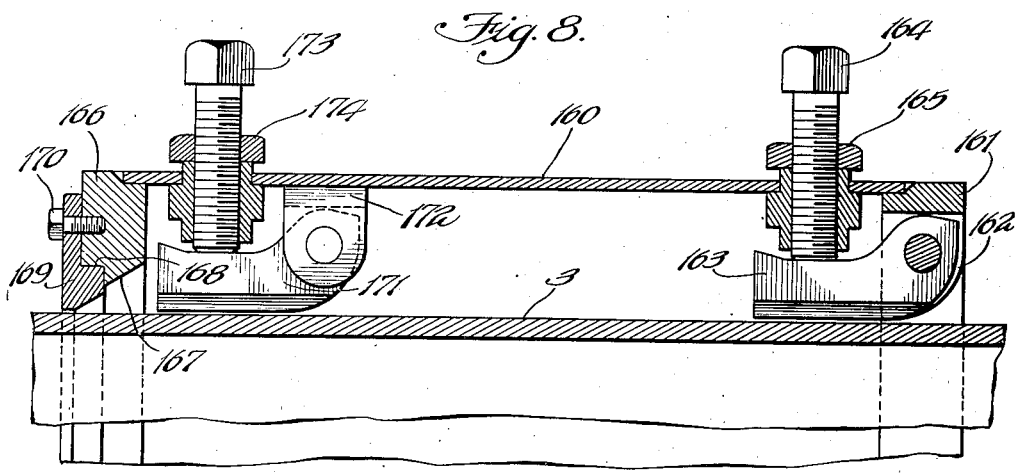
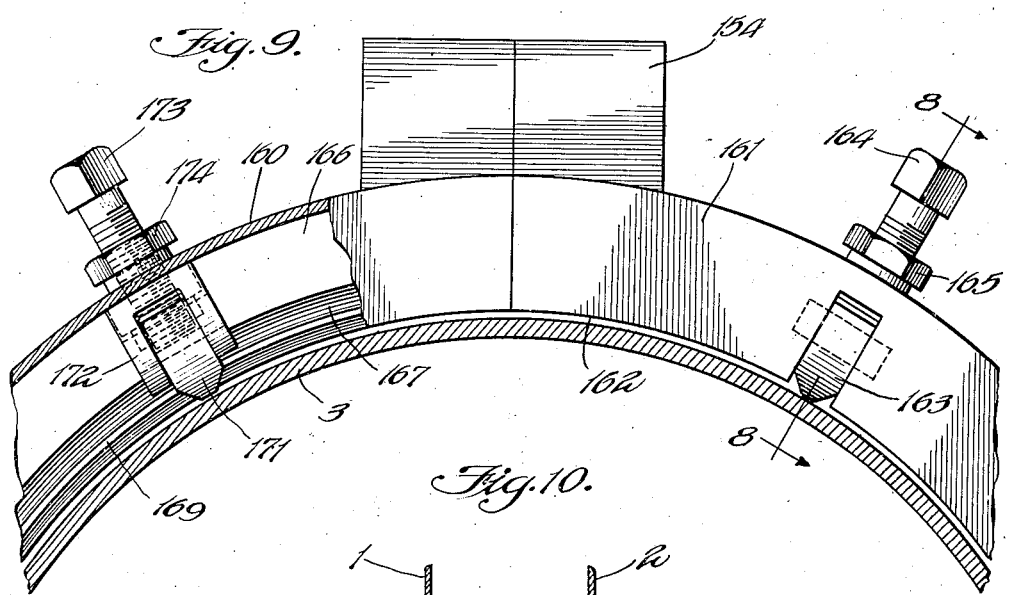
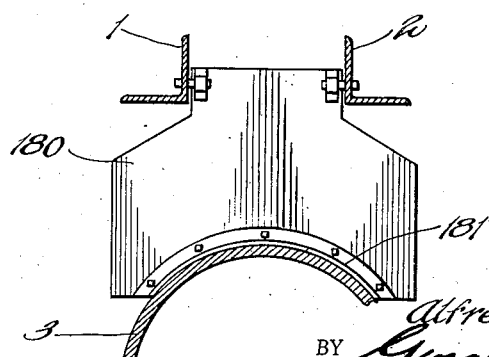
INVENTOR.
Alfred O. Mickelson
BY George H. Simmons
Atty.

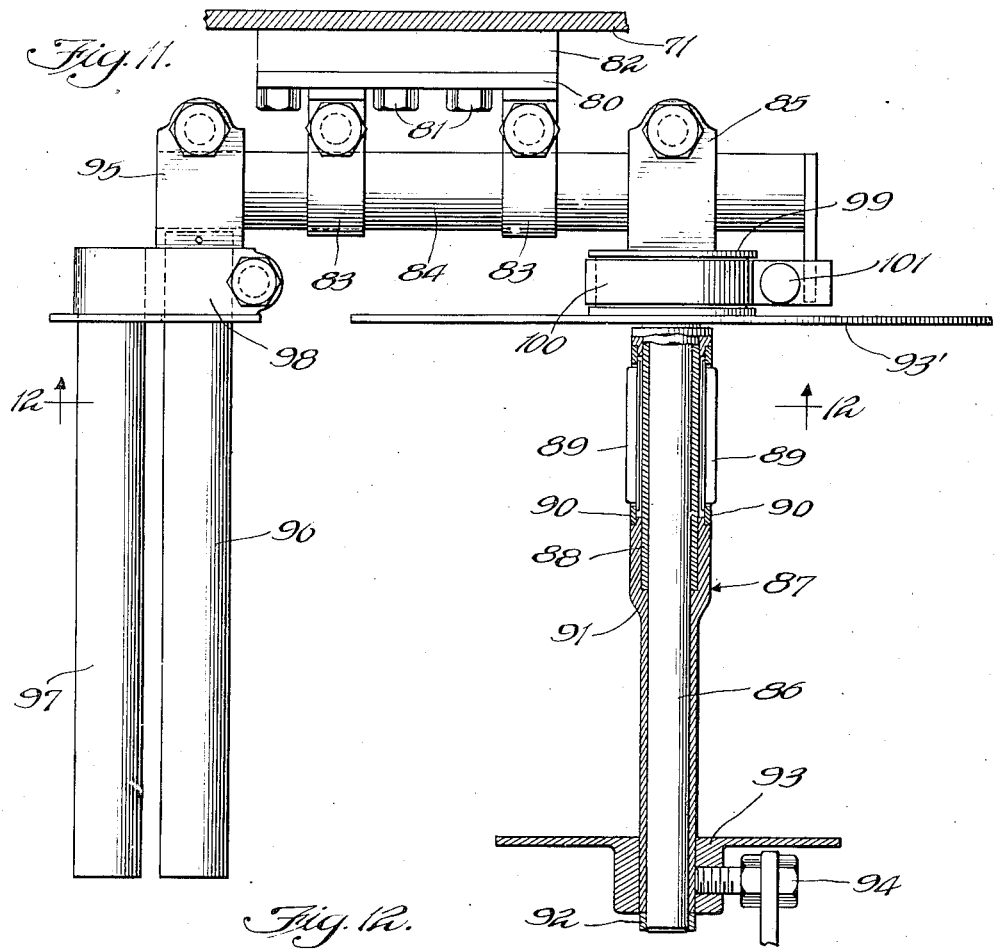
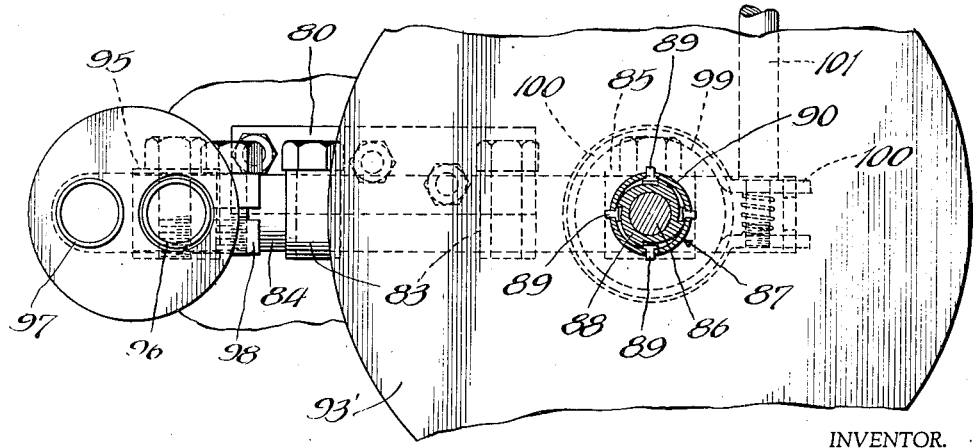

Patented Feb. 27, 1945

2,370,254

UNITED STATES PATENT OFFICE 2,370,254

PIPE-LINE COATING AND WRAPPING MACHINE

Alfred O. Mickelson, Elmhurst, Ill., assignor to Pipe Line Service Corporation, Franklin Park, Ill., a corporation of Illinois Application November 10, 1941, Serial No. 418,475

9 Claims. (Cl. 242—11)

This invention relates to power driven coating and wrapping machines adapted to travel along a pipeline and to apply a uniform layer of coating material thereto and to spiral wrap a layer or layers of suitable wrapping material over the coating material.

It is a main object of the invention to provide a new and improved combined coating and wrapping machine that is of simple construction and is rugged enough to withstand the hard usage to which machines of this type are subjected.

A further object of the invention is to provide a coating and wrapping machine that is self-balancing and capable of travelling along a pipeline unattended.

Still another object of the invention lies in the provision of a coating and wrapping machine capable of being used on pipelines of different diameters and capable of being quickly changed from one size of pipeline to another.

Still another object of the invention lies in the provision of a wrapping head for a coating and wrapping machine capable of applying a layer or layers of tight wrapped wrinkle-free wrapping and readily adjustable to the desired lap and spacing of laps between adjacent layers.

Still another object of the invention lies in the provision of a wrapping head wherein tension and angle of wrap of the wrapping material are maintained independently of the diameter of the roll of wrapping material.

Still another object of the invention lies in the provision of a new and improved coating shoe capable of being supplied with coating material either from the bottom or from the top of the shoe and capable of being quickly adjusted to supply a desired thickness of coating material to the pipeline.

Further objects of the invention, not specifically mentioned here, will be apparent from the detailed description and claims which follow, reference being had to the accompanying drawings in which a preferred embodiment of the invention is shown by way of example and in which:

Figure 7 is a cross-sectional view taken substantially along the line 7—7 of Figure 2, looking in the direction of the arrows and showing the reversing gears and clutches of the pump drive mechanism;

Figure 8 is a fragmentary cross-sectional view taken along the line 8—8 of Figure 9, looking in the direction of the arrows and showing particularly the coating shoe centering mechanism;

Figure 9 is a fragmentary end view of the coating shoe, partly in section and taken from the front or leading end of the coating shoe;

Figure 10 is a cross-sectional view taken along the line 10—10 of Figure 1, looking in the direction of the arrows, showing particularly the splash guard apron;

Figure 11 is a plan view of the wrapping head mechanism; and

Figure 12 is a cross-sectional view taken substantially along the line 12—12 of Figure 11, looking in the direction of the arrows.

Figure 1:
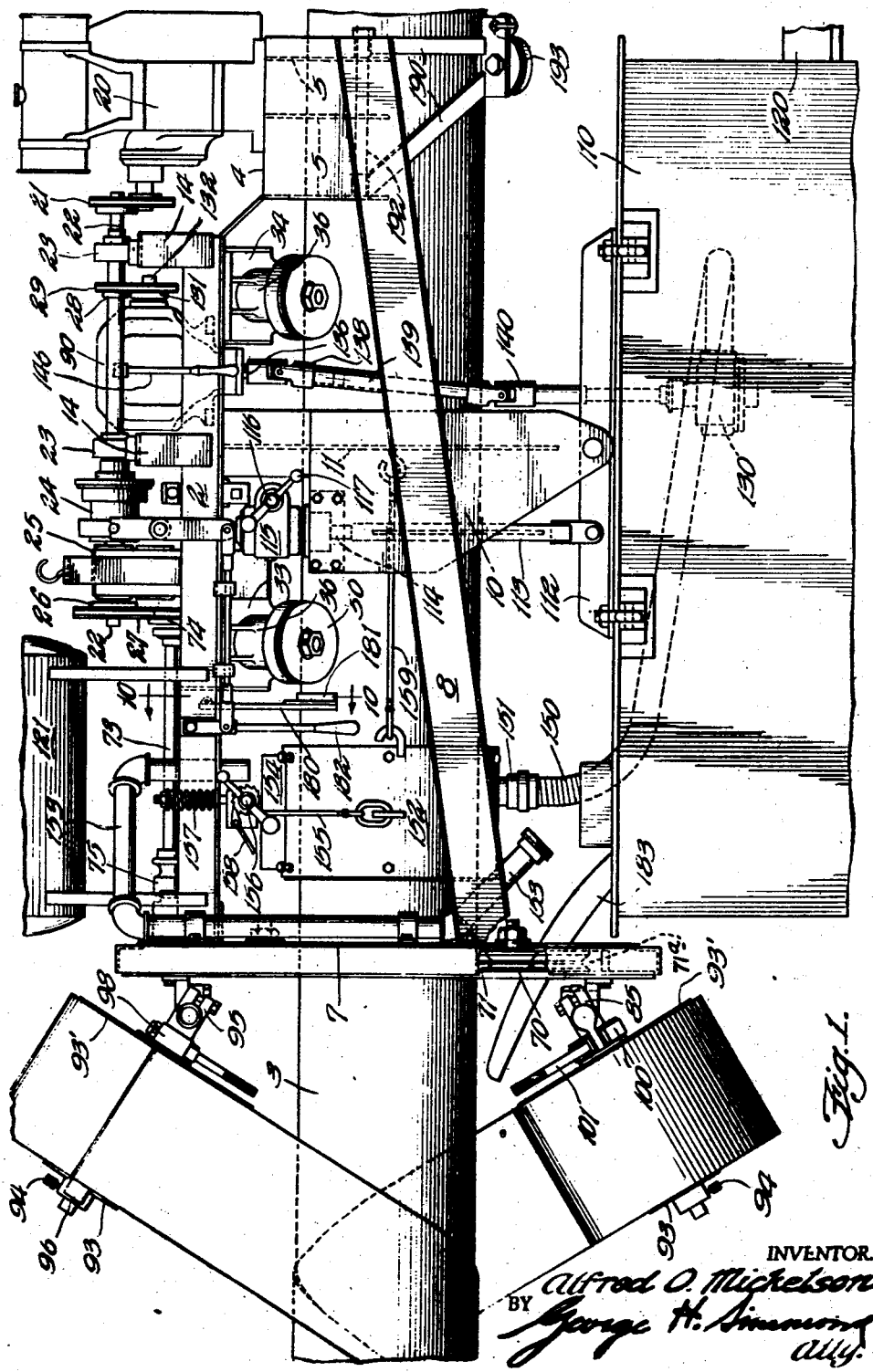
Figure 1 is a side elevational view of the machine in place on a pipeline.

Traveliners or machines which are supported upon and travel along a pipeline and apply thereto a coating of suitable coating material and over-wrap that material with a spiral wrap of suitable wrapping material applied either in a single layer or in a plurality of layers, are old in the prior art of which I am aware. The present invention is broadly an improvement upon these prior art devices. The prior art machines of this type have invariably been top heavy by reason of the fact that the center of gravity of the machine is above the axis of the pipeline and as a result, it has been necessary to provide a walking wheel or a walking beam supported by a workman to steady the machine on the pipeline. Owing to the roughness of the terrain in which pipelines are frequently laid, walking beams are most commonly employed and during the entire time that the machine is in operating position, a workman must be stationed on the walking beam to steady the machine.

As the result of this fact, river crossings and the like have been difficult to coat and wrap with existing machines by reason of the fact that it has been very difficult to steady the machine while it is travelling on the section of pipeline suspended above the river.

In the machine of the present invention, the center of gravity is maintained below the axis of the pipe with the result that the machine is inherently balanced and capable of travelling along a pipe line without steadying, thereby releasing for other work the workman who has heretofore been required for steadying the machine and also permitting machines travelling across a river crossing without danger of tipping over.

In the machines of the prior art of which I am aware, the framework of the machine has been supported upon the pipeline by frusto-conical traction rollers that are mounted upon a shaft journalled to the frame of the machine and extending transversely thereof, traction rolls of this type being clearly shown in the Patent No. 2,188,001 issued to Duaei, et al., January 23, 1940. These traction rollers have been keyed to the shafts upon which they are mounted and capable of adjustment longitudinally of the shafts to permit adjusting the machine to pipelines of various diameters. While an arrangement of this type is very satisfactory in a machine which is designed to apply only a film of coating material to the pipeline, its use in a combined coating and wrapping machine has resulted in difficulties.

The wrapping head mechanisms of such combined machines have invariably employed a ring gear mounted upon the framework of the machine and capable of rotation around the pipeline. The ring gear carries suitable wrapping head mechanisms and if the layer or layers of wrapping material are to be applied to the pipeline in wrinkle free condition, it is imperative that the center of rotation of the ring gear coincide exactly with the axis of the pipeline. In order to accomplish this condition in the machines of the prior art of which I am aware, it has been necessary to provide arrangements for adjusting the ring gear vertically and transversely of the machine framework so that when the relative position of the framework and axis of the pipe is altered by moving the traction rollers on their shafts, a corresponding altering of the relative position of the ring gear and machine framework can be achieved to center the ring gear on the axis of the pipeline.

In the machine of the present invention, bevel traction rollers are replaced by traction disks fixed upon axles which are disposed at angles of 45° from the vertical and journalled on the framework of the machine in such a position that the axes of the axle intersect on the median line of the machine, which median line lies in a vertical plane through the axis of the pipe. The traction disks being mounted at right angles to the axis of their axle engage the pipeline at angles of 45° from this vertical plane and when it is desired to change the machine from one size pipeline to another, disks of the proper diameter are substituted, these disks maintaining the point of intersection of the axes of the axles at a fixed distance above the axis of the pipeline with the result that the ring gear is centered upon the axis of the pipeline and need not be adjustable with respect to the frame of the machine.

It frequently happens in pipeline construction work that after the pipeline has been coated and wrapped, it is electrically tested to detect the presence of holidays or faults in the coating and wrapping material. In order that no holidays be present in the finished work, the machine must be equipped with a coating shoe that is capable of applying a holiday free film of coating material to the pipeline. For this purpose, I prefer to use a coating shoe of the general type shown in the co-pending application of Henry, Serial No. 390,244 filed April 25, 1941, now Patent No. 2,305,005 issued December 15, 1942. This coating shoe, which can be fed with coating material either from the bottom or top, as desired, completely encircles the pipeline and is spaced therefrom a very considerable distance so that when the shoe is filled with coating material, the pipeline is encircled by a bath of material which bath has appreciable thickness. The ends of the shoe are provided with rings, the leading one of which engages the pipeline and the trailing ring is spaced from the pipeline a distance depending upon the desired thickness of the film of coating material to be applied by the shoe. In the improved shoe shown in the drawings by way of example, this trailing edge ring is made of two sections, one of which is fixed in the shoe and the other is removable to permit substitution of a different ring when it is desired to alter the thickness of coating material to be applied to the pipeline.

The wrapping mechanisms of the prior art have invariably extended a web of coating material from a roll of such material that is supported upon a suitable reel on the ring gear directly to the pipeline with the result that the angle of engagement of the web and pipeline vary as the spool of material is paid out. Furthermore, tension has been applied to the web by braking mechanisms engaging the spool with the result that the tension varies as the diameter of the roll on the spool decreases.

In the wrapping mechanism shown in the drawings, the web is extended from the reel in an S-shaped path around a tensioning bar and a guide bar, which bars are set at the proper angle to give the desired angle of engagement of the web and pipeline and to put the desired tension on the web, these settings remaining constant regardless of the diameter of the roll of material on the reel with the result that the material can be wrapped on the pipeline in a wrinkle free spiral wrap of uniform tightness.

Figure 2:
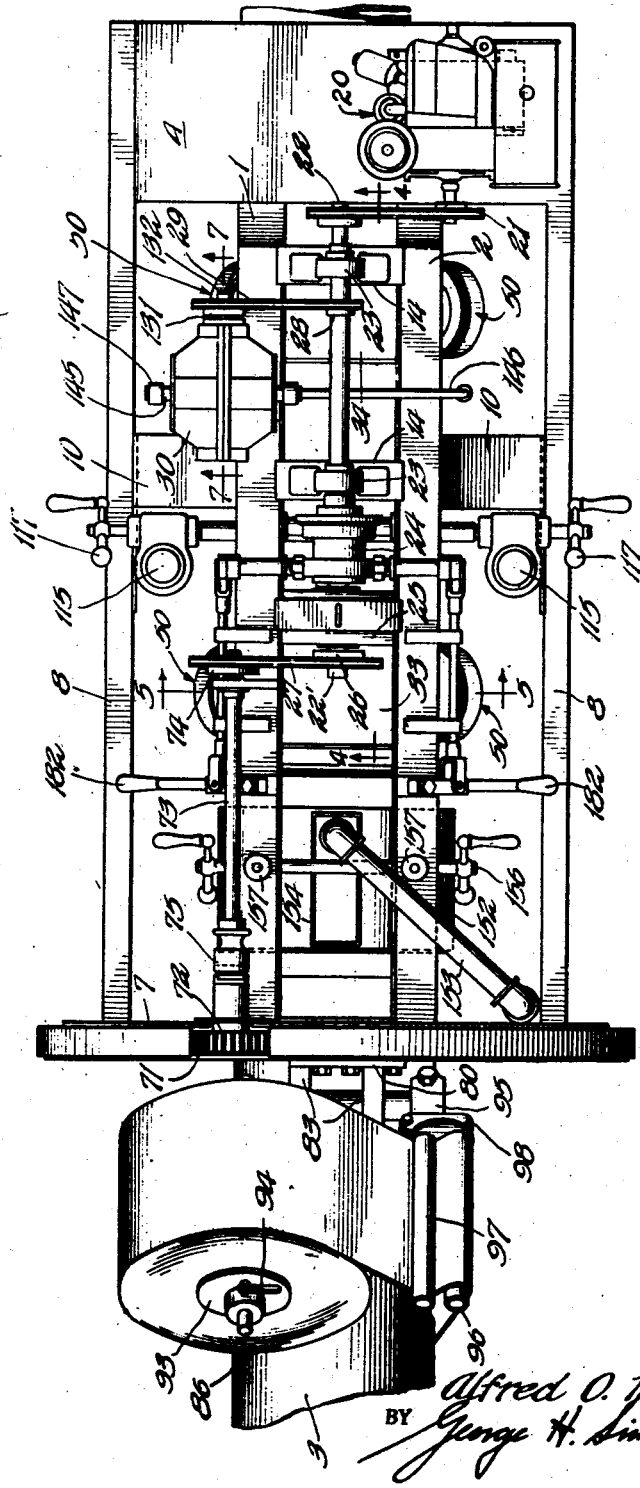
Figure 2 is a top side plan view of the machine.
Figure 3:
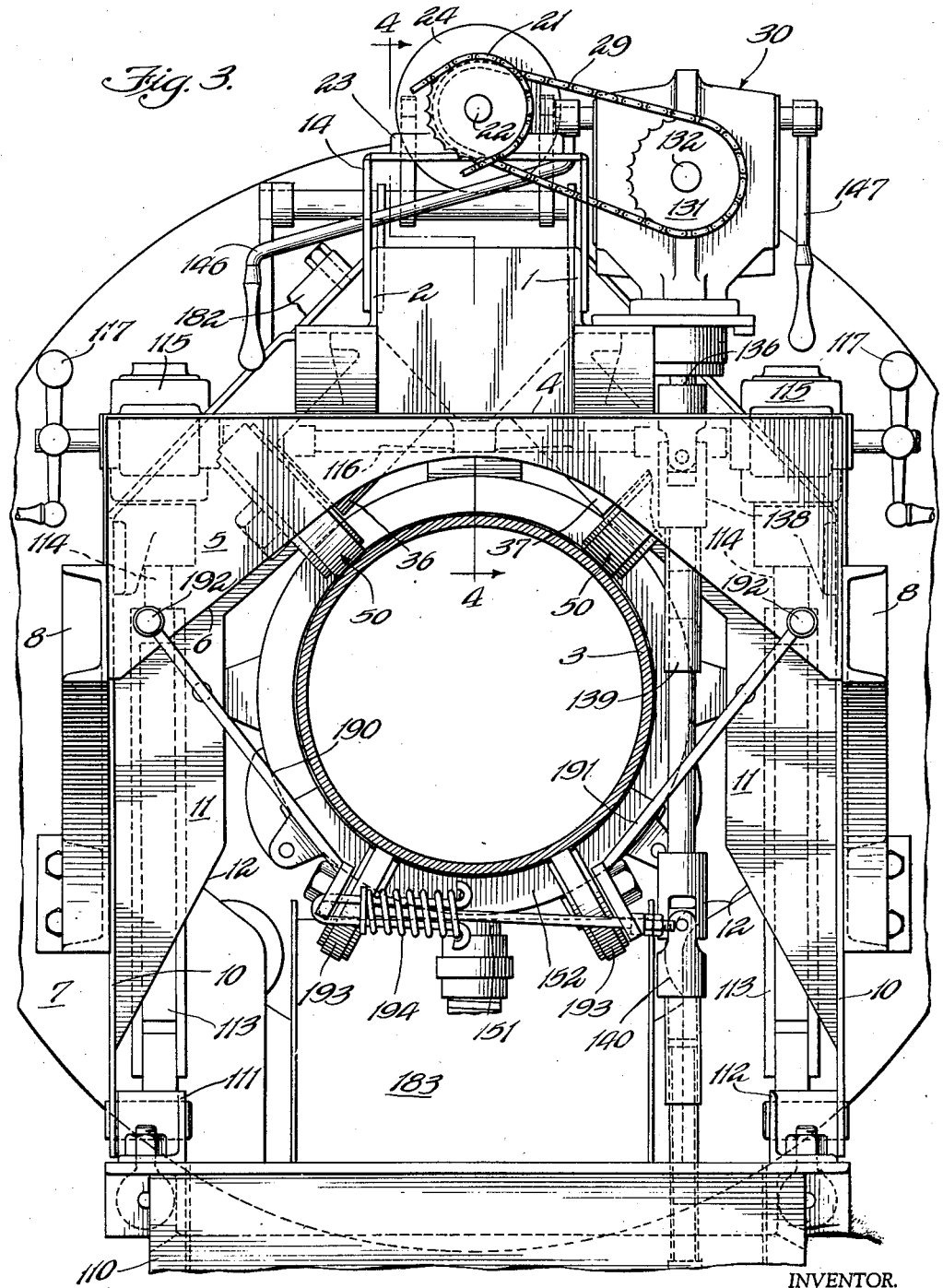
Figure 3 is an end view taken from the front or leading end of the machine with parts cut away.

Referring now to the drawings in more detail, particularly Figures 1, 2 and 3, it will be seen that the machine illustrated consists of a frame having longitudinally extending members 1 and 2 disposed parallel to each other and located above the pipeline 3. Members 1 and 2 may conveniently be angles. At the front or leading end of the machine, frame members 1 and 2 extend downwardly and connect with a platform 4, which platform is generally U-shaped and is re-enforced by suitable ribs 5 extending over the pipeline. The lower edges of these ribs 5 are arcuate in shape, as shown at 6 in Figure 3, to provide clearance for the pipeline. At the rear of the machine, frame members 1 and 2 connect with a generally circular mounting plate member 7 which serves as a mounting base for the ring gear. This plate 7 may be cut away at its lower most portion to permit placing the machine on the pipeline. Extending from the overhanging edges of the front platform 4, rearwardly and downwardly to the back plate 7, are side frame members 8, which members may conveniently be channels.

Approximately at the middle of the machine, front to back, is a generally U-shaped frame member 10 which is reenforced by a rib 11 which rib is cut away as shown at 12 in Figure 3 to provide clearance for the pipeline. Frame members 1 and 2 are connected together by U-shaped straps 14 which serve also as mounting bases for bearings that support the main driving shaft of the machine, as will presently appear.

Mounted upon the platform of the machine 4 is a suitable source of power, shown in the drawings as a gasoline engine 20, this particular source of power being shown by way of example only, as any suitable source of power such as an electric motor may be substituted if desired. The engine 20 is connected by a drive chain 21 to a main shaft 22, best seen in Figure 4. Shaft 22 is supported in suitable bearings 23 that are mounted upon the frame members 14 and extends rearwardly of the machine to a main clutch 24 through which a continuation shaft 22' extends into a gear box 25 and through that gear box, terminating in a sprocket wheel 26 by which the ring gear is driven through a driving chain 27, as will presently appear. Shaft 22 carries a sprocket wheel 28 which is encircled by a chain 29 that extends to a pump drive and reversing gear 30.

Figure 4:
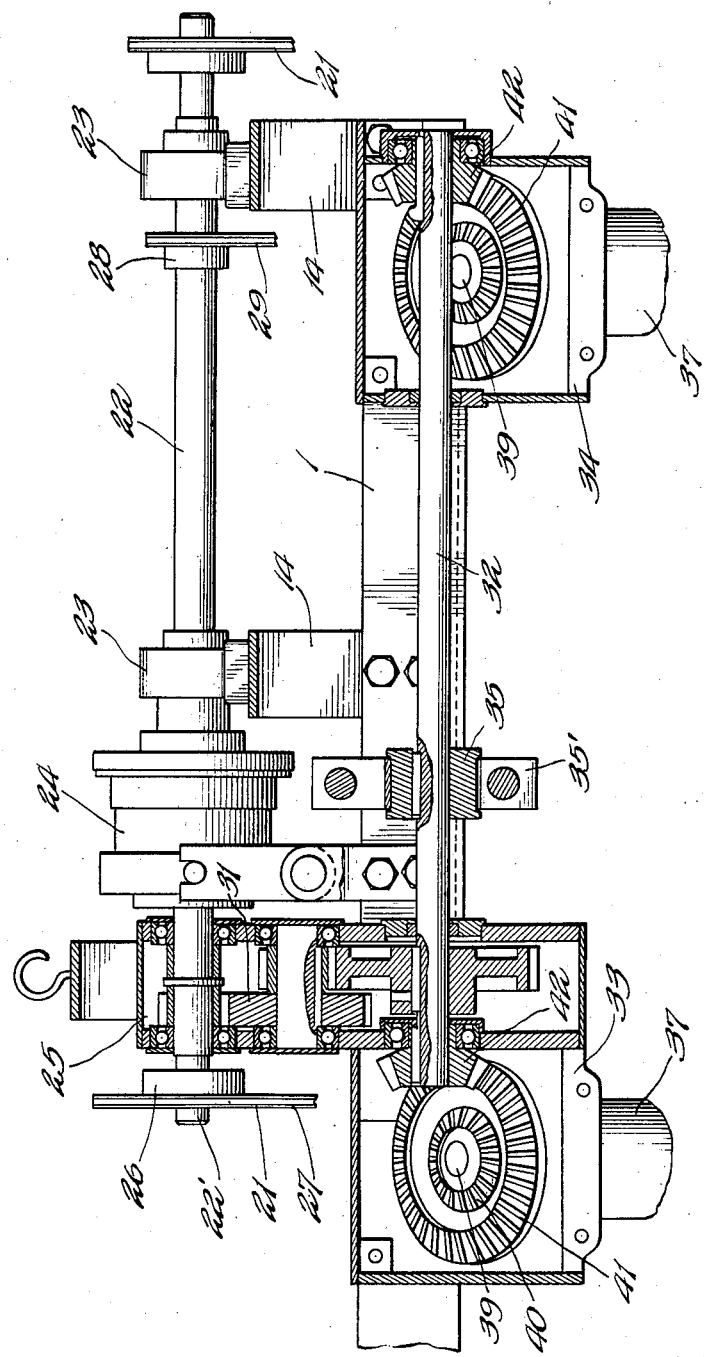
Figure 4 is a longitudinal view, partly in section along the line 4—4 of Figures 2 and 3, looking in the direction of the arrows and showing the driving gears for the traction rolls.

As will be seen in Figure 4, shaft 22' leading from the clutch and through the gear box 25 is connected by a train of reduction gears 31 to a propelling shaft 32 that is disposed on the median line of the machine between frame members 1 and 2. The shafts and gears in gear box 25 are supported in suitable low friction bearings, shown as ball bearings, and run in oil or grease which is retained in the gear box by suitable grease retainers.

Extending between the frame members 1 and 2 and forming a part of the main framework of the machine are gear boxes 33 and 34 into which shaft 32 extends and is supported by suitable bearings. As will be seen best in Figure 5, gear box 33 is formed with two bearing housings 36 and 37 that depend downwardly and outwardly from the frame members 1 and 2 and are adapted to receive suitable bearings 38 by which traction axles 39 are supported in the gear box. Within the gear box the axles 39 are connected together by suitable bevel gears 40 that are keyed to the axles to prevent rotation of the gear with respect to the axle. One of the axles also carries a bevel gear 41 of larger diameter which gear 41 is meshed with a bevel gear 42 that is keyed on the propelling shaft 32. Gear box 34 is an exact duplicate of the gear box 33 and need not be explained in further detail herein.

From the foregoing, it will be apparent that with the engine 20 running and shaft 22 rotating when the clutch 24 is engaged, shaft 22' will be rotated and with it through the reduction gears 31, shaft 32 will rotate at a lower speed. Rotation of shaft 32 causes traction axles 39 to be rotated for a purpose which will presently appear.

Figure 5:
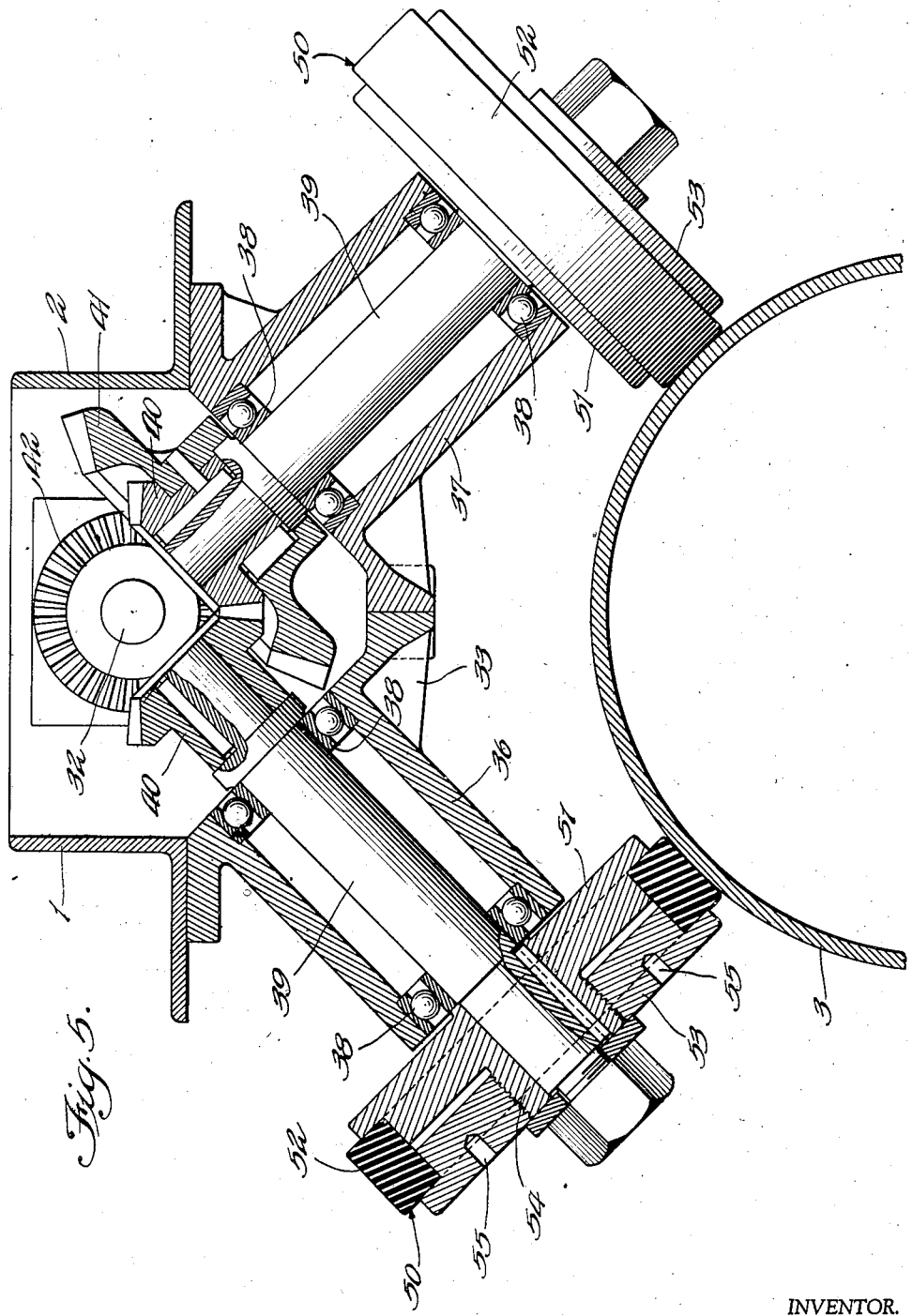
Figure 5 is a cross-sectional view taken substantially along the line 5—5 of Figure 2, showing particularly the traction roll arrangement.

Traction axles 39 extend beyond the housings 36 and 37 to receive a traction disk 50, the construction of which is best seen in Figure 5. As shown, this disk consists of a back plate 51 keyed to the axle and engaged by a traction ring 52 which ring may be composed of a rubberized fabric capable of maintaining a high frictional engagement with the pipeline without damaging the priming material thereon. The traction ring 52 is clamped against the disk 51 by a clamping ring 53 threaded upon the hub portion 54 of the disk 51 and tightened thereon by a spanner wrench engaging the spanner holes 55 in the disk 53.

Figure 6:
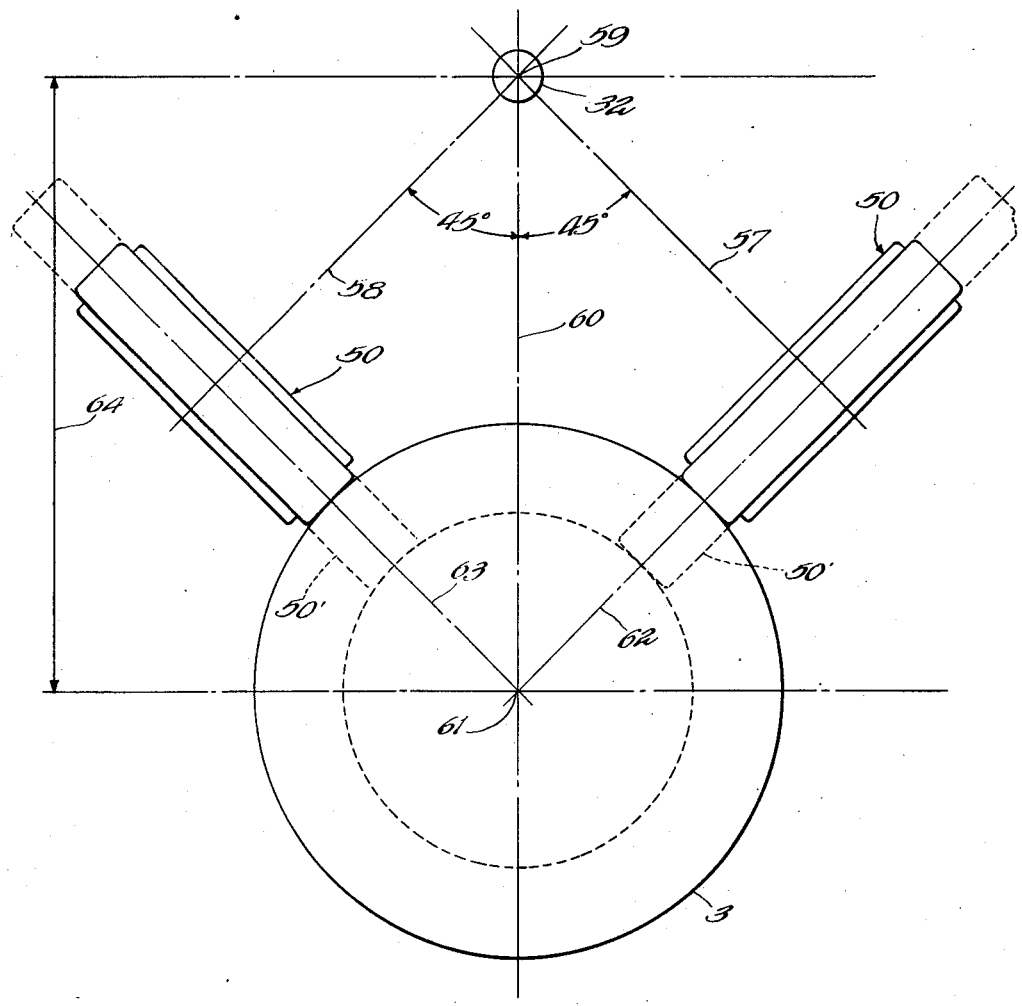
Figure 6 is a diagrammatic view illustrating the arrangement for accommodating the machine to pipelines of various diameters.

The traction roll thus described is keyed to and secured on the projecting end of the axle 39 by a suitable nut and washer so that the roll may be readily removed as desired. As will be seen in Figure 6, the axis 57 of one traction axle 39 intersects the axis 58 of the companion traction axle 39 at a point 59 which lies in a vertical plane 60 extending through the axis 61 of the pipeline 3. The axis of propelling shaft 32 coincides with the point of intersection of the axes 57 and 58.

Traction wheels 50 supported upon the axles 39 are disposed so that the median plane 62 through the traction wheel on axle 57 intersects the median plane 63 through the traction wheel on axle 58 on the axis 61 of the pipeline 3. By this arrangement, the point 59 is maintained at a fixed distance 64 above the axis 61 of the pipeline.

As shown in the drawings, axes 57 and 58 are each disposed at an angle of 45° from the plane 60, this angle being preferred. If desired, however, the angle between the axes and the plane 60 could be as little as 30° or as much as 60°. A 30° angle would result in moving the traction wheels closer to the horizontal diameter of the pipeline and increasing the angle to 60° would result in moving the traction wheels nearer the plane 60. Obviously, with the traction wheels nearer the plane 60, vertical support is increased and lateral support diminished and by moving the traction wheels nearer the horizontal diameter of the pipeline, that is by making the angle between the axes and the plane 60 a 30° angle, horizontal support is increased and vertical support lessened. The 45° angle shown balances the horizontal and vertical support and is preferred although this angle may be varied.

Traveliners are usually built to work on several sizes of pipelines, for example a machine might be designed to handle 4, 6 and 8 inch pipelines, another machine 8, 10, 12 and 14 inch and a larger machine might handle all pipeline sizes from 14 to 26 inches.

When it is desired to accommodate the machine to a pipeline of smaller diameter than shown in the drawings, traction rolls 50 are removed from their respective axles and replaced by larger diameter traction rolls 50', the rolls 50' being of such diameter that the distance 64 between the axis of the pipeline and the intersection of traction axles 57 and 58 is exactly the same as before. Thus it will be seen that by interchanging traction rolls, the machine can be accommodated to pipelines of various diameters without altering the relative position of the frame with respect to the axis of the pipeline.

It will frequently happen that the machine will have to run downhill on the pipeline, in which case, the weight of the machine will aid rather than retard its travel. To prevent the machine from going too fast under these circumstances, a brake drum 35 is keyed to shaft 32 and engaged by a suitable brake band 35' which can be adjusted to keep the machine speed at a desired value. Under most circumstances, brake band 35' will be loosened and will not retard the machine.

As will be best seen in Figure 3, the back plate 7 is generally C-shaped and is disposed with its open end down to permit removing the machine from a pipeline. Pivotally mounted upon this plate 7 are a plurality of V-groove pulleys or rollers 70. These rollers engage the inside surface of a ring gear 71a to support the gear on the machine. Fixed upon the ring gear is an annulus plate 71 having a central opening of a diameter larger than the diameter of the largest pipeline the machine is adapted to handle. The plate 71 is thus disposed substantially parallel to the back plate 7 and its outer periphery is disposed in juxtaposition to a flange on plate 7 to form an enclosed space around the ring gear 71a.

Ring gear 71a has external teeth that are engaged by a pinion 72, Figure 2, that is disposed within the enclosure formed by plates 7 and 71. Pinion 72 is loosely mounted upon a shaft 73 that projects through the back plate 7. The combination of plate and ring gear shown in the drawings and used in a preferred embodiment of the invention is in reality a ring gear and for convenience herein is hereinafter referred to as ring gear 71a.

A sprocket wheel 74 keyed upon shaft 73 is engaged by the chain 27 so that shaft 73 will be driven by rotation of the main shaft 22'. A clutch 75 when engaged with its companion member carried by pinion 72 keys that pinion to the shaft 73 so that the ring gear will be rotated. Mounting rollers 70 are located upon the plate 7 so that with the frame of the machine located with respect to the axis of the pipe, as hereinbefore explained, ring gear 71a will be centered upon that axis. If desired, ring gear 71a may be provided with a removable section which can be registered with a gap in the mounting plate and removed to permit placing the machine on a pipeline.

As shown in the drawings, the ring gear will be driven at constant speed with respect to the rotation of the traction rolls 50, that is, the ring gear will make a fixed number of revolutions around the pipeline as the machine is travelling a fixed distance therealong. In order to vary the number of revolutions of travel of the ring gear with respect to the speed of travel of the machine along the pipeline thereby to alter the angle of wrap and with it the degree of lap, sprocket wheels 26 and 74 are replaced by other sprocket wheels having the correct number of teeth to give the desired rotation of the ring gear.

As will be seen in Figures 11 and 12, the wrapping mechanism carried on the plate 71 consists of a mounting bracket 80 fixed upon the plate by suitable bolts 81 and spaced therefrom by a suitable spacer 82. Bracket 80 carries clamps 83 which extend around and tightly clamp a mounting bar 84. Fixed upon this mounting bar by a suitable clevis clamp 85 is a shaft 86 upon which is mounted a paper spindle indicated generally at 87. As shown, this spindle consists of a cam sleeve 88 which is engaged by lugs 89 that extend through suitable slots in an outer sleeve 90, which sleeves and cams are held in position on the shaft by a tapered sleeve 91 which in turn is secured on the shaft by a collar 92. Sleeve 88 carries a disk 93' so that a roll of wrapping material placed on the spindle so formed will be positioned in a fixed position with respect to the mounting bar 84. The roll, not shown, is secured on the spindle by a suitable flange plate 93 that is locked upon the sleeve 91 by suitable means such as the stud screw 94.

Also mounted upon the mounting bar 84 by suitable clevis clamp 95 is a guide bar 96 which is disposed with its axis parallel to the axis of the spindle 86. Guide bar 96 serves as a support for tensioning bar 97 which is secured thereto by a suitable clevis clamp 98 which permits rotation of the tensioning bar around the guide bar.

As will be seen in Figure 2, the web of wrapping material from the roll carried on spindle 86 extends in a generally S-shaped path, first around the tensioning bar 97 and then around the guide bar 96 to the pipeline 3. Guide bar 96 is adjusted so that the web of wrapping material lies in a plane that is tangential to the pipeline at the line of contact of the wrapping material therewith and tangential to the guide bar 96 along the line of departure of the web of material therefrom and so that this line of departure is at right angles to the edges of the web of material.

Fixed upon the disk 93' of the reel is a brake drum 99 which is engaged by a brake band 100, which band is tensioned by suitable tensioning rod 101 with a light tension that is just sufficient to keep the roll of material from unwinding too freely. The main tension on the web of wrapping material is applied by the friction of tension bar 97 and guide bar 96 and when once set to a desired value remains constant irrespective of the diameter of the roll of material on the spindle.

As shown in Figure 1, the ring gear 71 is provided with two wrapping mechanisms both of which are mounted directly on the ring gear without the use of spacing members 82. An arrangement of this kind is employed when it is desired to apply a double lead single wrap wrapper on the pipeline. Both spindles are provided with the same kind of wrapping material and the ring gear is driven at a relatively slow speed with respect to the travel of the machine along the pipeline.

In some instances, it may be necessary to apply a single lead single layer wrapper on the pipeline, in which case, one winding mechanism may be omitted and suitable counterweights substituted therefor to keep the machine in balance. The sprockets through which the ring gear is driven are changed so that the ring gear makes approximately twice as many revolutions as would be required for a double wrap.

In other instances, a single lead double layer wrap may be required, in which case, wrapping material of one kind is placed next to the pipeline and is overlaid with a layer of a different kind of material. Usually in double thickness wrappings of this type, it is preferable to stagger the laps so that the lap of the outer layer falls midway between the laps of the inner layer of wrapping material. Spacing blocks 82 are employed for this purpose, these blocks being of such thickness as to position one of the wrapping heads outwardly from the ring gear 71 sufficiently to stagger the lap in the web put on by that mechanism with respect to the lap in the web put on by the mechanism that is directly adjacent the ring gear.

If desired, plate 71 may be provided with four wrapping mechanisms so as to enable the machine to put a double lead, double wrap wrapper on the pipeline. With four spindles on the plate and each carrying a full spool of wrapping material, the machine becomes somewhat tail heavy and for this reason such practice is not ordinarily followed although the machine is capable of following such procedure.

Spacing lug 82 in Figure 11 is shown as being relatively thin, this particular showing being by way of example and merely to illustrate the manner in which one wrapping mechanism is spaced away from the ring gear as required. Spacing blocks of various thicknesses may be provided to secure any desired spacing of the laps on the pipeline.

When two wrapping mechanisms are provided on the ring gear, guide bar 96 in addition to the adjustments heretofore mentioned is moved longitudinally of mounting bar 84 so that the line of contact of the web of material on the pipe from one mechanism will be exactly 180° from the line of contact of the web of material from the other mechanism, that is, the two webs engage the pipeline at diametrically opposite points. When four wrapping mechanisms are used the guide bars 96 are adjusted so that adjacent lines of contact of web and pipeline will be 90° apart.

In order to supply coating material to the pipeline, a tank 110 is fixed to mounting brackets 111 and 112 which brackets are in turn pivoted to frame members 10. Also attached to mounting bars 111 and 112 are tank levelling devices 113 which consist of a suitable rod carrying at its upper end a threaded shaft 114 which engages a nut housed within the levelling housings 115. A shaft 116 extending transversely of the machine is maintained in driving connection with the levelling nuts so that as one of the handles 117 on this shaft 116 is rotated in one direction, levelling bars 113 will be raised to raise the back end of the tank and when the handles are rotated in an opposite direction, the back end of the tank will be lowered.

Mounted within the tank is a heating chamber so that heat from a suitable torch 120 may keep the coating material in the tank at proper application temperature, the torch being fed with fuel from a fuel tank 121 carried on the frame of the machine. The particular construction of the tank and heating devices therefor will be readily understood by one skilled in the art and are explained more fully in Patent No. 1,951,085 issued to Cumfer March 13, 1934, to which patent reference is made for those details.

Mounted within the tank and submerged in the coating material therein is a pump 130 which may be conveniently a positive displacement pump of the gear type although other pumps may be used. The pump is driven through chain 29 engaging a sprocket on the main drive shaft 132 and a sprocket 131 on the shaft 132 of the pump gear box and reversing mechanism best seen in Figure 7. Mounted within this gear box and loosely upon the shaft 132 are bevel gears 133 and 134 which are both constantly meshed with a bevel gear 135 that is keyed upon a shaft 136, which shaft is supported in suitable bearings 137 in the gear box. An articulated pump drive shaft, shown in the drawings as consisting of a universal joint 138 keyed to shaft 136 and telescoping connection 139 and universal joint 140, connects the pump to the gear box. Keyed upon the shaft 132 but slidable therealong are clutch elements 141 and 142 which elements are connected together by a collar 143 that is engaged by operating links 144 on the operating shaft 145. Handles 146 and 147, Figure 2, are fixed upon opposite ends of shaft 145. By rotating the shaft 145 in one direction, say in a clockwise direction, Figure 7, clutch element 141 is moved to the left into driving engagement with bevel gear 133 to key that gear to the shaft 132, thereby to rotate the pump in one direction. A movement of operating shaft 145 in a reverse or counterclockwise direction first disengages the clutch member 141 from bevel gear 133 and subsequently connects clutch member 142 to bevel gear 134, thereby to cause the pump to be driven in an opposite direction.

Gear box containing gears 133, 134 and 135 is preferably filled with oil or other suitable lubricant which is retained in the box by grease retainers 148 to properly lubricate the bearings and other devices in the gear box.

Connected to the outlet side of the pump 130 is a flexible tubing 150 which may be connected by suitable union 151 to the bottom of a coating shoe 152, thereby to feed coating material to that shoe from the bottom or, if desired, the flexible tubing 150 may be connected to piping 153 which extends upwardly along the plate 7 and discharges into the funnel-like portion 154 at the top of the shoe. A suitable cap is placed upon coupling 151 to close off the bottom of the shoe when the same is being fed from the top.

The coating shoe 152 is of the general type shown in the abovementioned co-pending application of Henry and consists of a generally cylindrical housing encircling the pipe and flexibly supported upon the frame of the machine by suitable means, such as cable 155 which encircles a shaft 156 that is resiliently mounted on the frame by suitable means such as springs 157. The shaft is equipped with a ratchet and pawl 158 so that the shoe can be drawn into tight engagement with the pipe. A chain or other suitable drag link 159 is connected at one end to the shoe and at the other end to a hook carried on the reenforcing rib 11 of the frame member 10 to drag the shoe along the pipe as the machine travels therealong.

As will be seen best in Figures 8 and 9, the coating shoe consists of an outer generally cylindrical wall 160 that is spaced away from the pipeline 3 and carries at its front end a ring 161 which contains an arcuate inner surface 162 forming an entrance port leading into the shoe. Preferably the ring 161 and the cylindrical wall are formed in three sections to permit opening the shoe to facilitate its removal from the pipe and to permit the shoe to open sufficiently to pass over welds and other obstructions in the pipeline. Each section of the ring 161 carries two centering skids 163 pivoted in suitable slots in the ring and urged inwardly of the shoe and against the pipeline by adjusting screws 164 which are threaded through suitable bushings in the cylindrical member 160 and are locked in place by lock nuts 165.

At the rear or trailing end of the shoe, member 160 carries a ring 166 which is formed with an inner tapered wall 167 that is spaced from the outside surface of the pipeline and is shouldered at 168 to receive a second ring 169 that is attached thereto in any suitable manner such as by stud screws 170. The inner wall of the ring 169 is turned on a diameter equal to the outside diameter of the pipeline plus twice the desired thickness of the film of coating material that is to be applied. The rings 166 and 169 are also formed in three sections. Each section of the ring carries two centering slides 171 that are pivotally mounted to brackets 172 fixed on the inside surface of the outer wall member 160 and are urged against the pipeline by adjusting screws 173 which are threaded through suitable collars in the outer wall member 160 and retained by lock nuts 174. Through the adjustment of screws 173 and 164, the shoe is set in exact concentricity of the pipeline. Should a weld or other obstruction in the pipeline be encountered, the sections of the shoe will move apart slightly to permit the shoe to ride over the obstruction. If it is desired to vary the thickness of coating material, rings 169 are removed from the shoe and replaced by similar rings having an inside diameter correct for the desired thickness of coating.

In the operation of the machine, after the tank 110 has been filled with coating material of proper application temperature and the gasoline engine 20 has started and the coating shoe is in place on the pipeline, pump 130 is started to fill the coating shoe with coating material, the excess flowing upwardly and out of the funnel-like extension 154 of the shoe. This initial flow of coating material brings the coating shoe up to a sufficiently high temperature that it does not chill the coating material, thereby insuring a proper application of the film of the material on the pipe.

As will be seen in Figure 1, the rear pair of traction rollers 50 are rather close to the leading edge of the coating shoe and excess material flowing out of the top of the shoe may build up on the pipeline to such an extent that there is danger that it might foul the traction rollers. To guard against a contingency of this kind, as will be seen in Figures 1 and 10, a gate 180 is pivotally mounted upon the frame members 1 and 2 and shaped to closely embrace the top surface of the pipeline. The gate 180 is provided with a wiper 181 of soft resilient material which engages the pipeline and is fixed upon the gate 180 in any suitable manner, such as by bolts or by rivets. Coating material flowing on to the shoe strikes the gate and is deflected downwardly over the sides of the pipe without coming into contact with the traction rolls. When the wrapping head has been filled with rolls of wrapping material and everything is in readiness for operation, the main clutch 24 is operated by its operating lever 182 to connect the engine in driving relation with the traction rolls, thereby causing the machine to travel along the pipe line and the wrapping head to revolve therearound. Apron 180 trails along in the space between the traction rolls and coating shoe without particular purpose. Coating material applied to the pipe may drip off of it prior to the application of the wrapping material to the pipe and such material is caught in a suitable pan 183 which extends through the ring gear and in close proximity of the pipeline and empties the material so caught into the tank 110 so that little or no material is wasted.

Although the machine thus shown and described is balanced in all directions, it is advisable to provide it with a nose wheel to prevent the front end of the machine from jumping off of the pipe should the wrapping head become fouled. As shown in the drawings, the nose wheel consists of brackets 190 and 191 which are pivotally mounted upon suitable bolts 192 that are extended through the re-enforcing flanges 5 of the front platform of the machine. Pivotally mounted at the lower end of the arms 190 and 191 are rollers 193 which may be of the same general construction of traction rollers 50. A spring link 194 connects the brackets 190 and 191 together and holds the nose rollers 193 in resilient connection with the pipeline.

It will be noted that the control levers of the machine are all provided in duplicate so that the machine can be operated from either side of the pipeline. The pump may be operated independently of the traction rolls and the ring gear drive may be disconnected so that the machine can be moved along the pipeline without revolving the ring gear therearound. Traction rolls 50 and the coating shoe 152 are readily accessible from either side of the machine owing to the fact that the framework is open adjacent these devices. The ring gear is centered on the axis of the pipeline and the wrapping mechanism carried thereon can be readily adjusted to apply a wrinkle free spiral wrap on the pipeline as the machine travels therealong. The center of gravity of the machine is below the axis of the pipeline so that no steadying of the machine thereon is necessary, in fact, it has been found that if the machine is set on the pipeline at an angle, it will soon right itself into a vertical position as it travels along the line.

A machine built in accordance with the teachings of the present invention is possessed of many advantages. It is of simple rugged construction and is not severely damaged even when dropped with the pipeline, as frequently happens. All working parts are fully protected and for the most part run in oil or grease. Adjustments are made simple by the use of interchangeable parts, all of which are readily accessible. The machine balances itself on a pipeline and requires fewer men to operate than do machines of the prior art.

While I have chosen to show my invention by illustrating and describing a preferred embodiment of it, I have done so by way of example only, as there are many modifications and adaptations which can be made by one skilled in the art within the teachings of the invention.

Having thus complied with the Statutes and shown and described a preferred embodiment of my invention, what I consider new and desire to have protected by letters patent is pointed out in the appended claims.

What is claimed is:

1. In a pipeline coating and wrapping machine, a frame adapted to extend longitudinally along a pipeline, a pair of bearing means fixed upon said frame, an axle supported in each one of said bearing means and depending outwardly and downwardly therefrom, said bearing means supporting said axles so that the axes of the axles are disposed at acute angles to a perpendicular plane through the longitudinal median line of said frame, and intersect in said plane, a traction roll fixed upon the depending end of each of said axles, a second pair of bearing means fixed upon said frame, an axle supported in each one of said second pair of bearing means and depending outwardly and downwardly therefrom, said second bearing means supporting said second axles so that the axes of the axles are disposed at acute angles to said perpendicular plane through the longitudinal median line of said frame and intersect in said plane, a traction roll fixed upon the depending end of each of said second axles, and means for rotating all of said axles at the same speed, thereby to cause said traction rolls to move the machine along a pipeline engaged by said traction rolls.

2. A supporting and driving device for a pipeline coating machine comprising, four disk-like traction rolls of equal diameter arranged in pairs and engaging the pipeline with one pair on each side of a vertical plane through the axis of the pipeline, means including bearings and axles depending downwardly and outwardly therefrom for supporting said rolls so that a plane through the median planes of the pair of rolls on one side of said vertical plane intersects a similar plane through the median planes of the pair of rolls on the other side of said vertical plane on the axis of the pipeline, said axles being disposed so that the axis of the axle supporting a roll of one pair intersects the axis of the axle supporting a corresponding roll of the other pair in said vertical plane through the axis of said pipeline, means for fixing said rolls on said axles, said means permitting ready removal of the rolls to permit substituting rolls of larger diameter to accommodate the machine to a pipeline of smaller diameter, and means for rotating said axles and rolls all at the same speed, thereby to cause the rolls to move the machine along the pipeline engaged by the rolls.

3. In a pipeline coating and wrapping machine, a pair of spaced apart frame members extending longitudinally of the machine, a pair of gear boxes disposed between and fixed to said frame members, a pair of bearings formed in each gear box and extending downwardly and outwardly therefrom below said frame members, a traction axle in each bearing extending into the gear box and projecting downwardly and outwardly from the bearing, bevel gears in each gear box connecting together the pair of axles therein, a disk-like traction roll fixed on the projecting end of each axle, and drive means for rotating all of said axles at the same speed to cause said traction rolls to move the machine along a pipeline engaged by the traction rolls.

4. In a pipeline coating and wrapping machine, a frame adapted to extend longitudinally along a pipeline, a pair of spaced apart gear boxes fixed on said frame, a pair of traction axles depending from each gear box at acute angles to a vertical plane, gear means in each gear box connecting together the pair of axles depending from that gear box, a disk-like traction roller fixed upon the depending end of each of said traction axles, and means including a drive shaft extending between said gear boxes for rotating all of said axles at the same speed to cause said traction rolls to move the machine along a pipeline engaged by the traction rolls.

5. In a machine for coating and wrapping pipelines as the machine travels therealong, a ring gear, means on said machine for mounting said ring gear thereon for rotation around the axis of the pipeline as a center, a plurality of wrapping assemblies mounted upon said ring gear, each of said assemblies comprising, a mounting shaft spaced from and fixed on said ring gear with its axis parallel to the face thereof, an arbor fixed on said shaft and capable of limited rotation therearound to permit setting the arbor at right angles to a web of wrapping material running from the assembly to the pipeline, a reel mounted on said arbor for rotation therearound, a guide bar fixed upon said shaft and capable of limited rotation therearound to permit setting the bar with its axis parallel to the axis of said arbor and capable of longitudinal movement along the shaft to permit setting the bar with respect to the pipeline so that wrapping material will extend from the bar in a plane to the pipeline, a tensioning bar mounted on said guide bar and capable of rotation around the guide bar to permit setting the same in contact with the wrapping material to apply tension thereto, and means including a pinion gear engaging the ring gear for rotating the same, thereby to rotate said wrapping assemblies around the pipeline.

6. In a machine for coating and wrapping pipelines as the machine travels therealong and in which the wrapping is applied by a ring gear on the machine rotated around the axis of the pipeline as a center, a plurality of mounting bars mounted on the ring gear and spaced therefrom with their axes parallel to the face of the ring, a corresponding plurality of arbors, means including a clevis fixed on each arbor and encircling one of said mounting bars for mounting the arbors with their axes at right angles to the axes of the mounting bars, a reel carried on each arbor and rotatable therearound, and adapted to hold a roll of wrapping material, and a plurality of tensioning devices, one for each reel and each comprising, a guide bar, clevis means for fixing the guide bar upon one of the mounting bars with its axis at right angles to the axis of the mounting bar, and a tensioning bar, means for mounting the tensioning bar upon the guide bar with its axis parallel thereto, said means permitting the tensioning bar to be moved around the axis of the guide bar so that a web of wrapping material may be passed from the roll on the reel in a generally S-shaped path around the tensioning bar and guide bar and from the guide bar to the pipeline to be wrapped thereon as the ring gear and devices carried thereby are rotated therearound.

7. A wrapping device for a pipeline coating and wrapping machine comprising, a mounting bar, an arbor, clevis means fixed on said arbor and encircling said mounting bar to mount the arbor thereon with its axis at right angles to the axis of the bar, a reel on said arbor rotatable therearound, collar means on the arbor for holding said reel thereon, means on said reel for securing a roll of wrapping material thereon, said means locking the roll against rotation with respect to the reel, a guide rod, clevis means fixed on said guide rod and encircling said mounting bar to mount the guide bar with its axis at right angles to the axis of the mounting bar, a tensioning rod, clevis means fixed on said tensioning rod and encircling said guide rod to mount the tensioning rod thereon with its axis parallel to the axis of the guide rod, said guide rod and tensioning rod being spaced from said arbor so that a web of wrapping material may be passed from a roll on said reel in a generally S-shaped path around the tensioning bar and guide bar and from said guide bar to a pipeline to be wrapped thereon as the wrapping device is rotated around the pipeline, and means for rotating said wrapping device around the pipeline.

8. In a machine for applying protective materials to pipelines, a pair of gear boxes, a pair of bearing housings projecting downwardly and outwardly from each one of said gear boxes, a shaft in each of said housings projecting therefrom, bearing means in said housings supporting said shafts therein, a traction disk fixed on the projecting end of each of said shafts, a frame carried by said gear boxes and disposed above said traction disks, said frame being open adjacent said disks to render the disks readily accessible, a source of power on said frame, and means including gears in said gear boxes for rotating said shafts all at the same speed and in the same direction.

9. A machine for coating and wrapping pipelines that is adaptable to pipelines of different diameters, comprising, a frame, bearings fixed upon said frame, axles rotatably supported by said bearings and disposed at acute angles to a vertical plane, said axles extending beyond said bearings, disk-like traction rollers fixed upon the extending portions of said axles and engaging the pipeline to support the machine thereon, wrapping means including a ring gear supported on said frame with the ring gear centered on the axis of the pipeline, said ring gear having an internal diameter large enough to clear the largest pipeline on which the machine is adapted to fit, said traction rolls being removable from said axles and replaceable by rolls of larger diameter to accommodate the machine to a pipeline of smaller diameter, said larger diameter rolls supporting said frame on the pipeline in such position that said ring gear is centered on the axis of the smaller pipeline, and means for rotating said axle and traction rollers to move the machine along the pipeline.

ALFRED O. MICKELSON.